United States Patent [19]

Walmsley

[11] Patent Number: 5,120,771

[45] Date of Patent: Jun. 9, 1992

[54] PROCESS FOR THE PRODUCTION OF POLYURETHANE FOAM

[75] Inventor: Graham D. Walmsley, Hickory, N.C.

[73] Assignee: Hickory Springs Manufacturing Co., Hickory, N.C.

[21] Appl. No.: 406,974

[22] Filed: Sep. 13, 1989

[51] Int. Cl.$^5$ .............................................. C08G 18/08
[52] U.S. Cl. ...................................... 521/107; 521/113
[58] Field of Search ................................. 521/107, 113

[56] References Cited

U.S. PATENT DOCUMENTS

| | | | |
|---|---|---|---|
| 2,737,503 | 3/1956 | Sprague et al. | 264/55 |
| 3,121,699 | 2/1964 | Merriman | 260/2.5 |
| 3,165,483 | 1/1965 | Gemeinhardt | 260/2.5 |
| 3,193,525 | 7/1965 | Kallert | 260/45.9 |
| 3,367,892 | 2/1968 | Jorczak et al. | 427/136 |
| 3,586,651 | 6/1971 | Salyer | 260/2.5 |
| 3,661,885 | 5/1972 | Haddick | 260/97.5 |
| 3,985,688 | 10/1976 | Speech | 260/2.5 |
| 4,055,522 | 10/1977 | Ashida et al. | 260/2.5 |
| 4,246,356 | 1/1981 | Walmsley | 521/50 |
| 4,251,635 | 2/1981 | Stone | 521/113 |
| 4,259,454 | 3/1981 | Crivello | 521/113 |
| 4,263,408 | 4/1981 | Meyborg et al. | 521/51 |
| 4,303,758 | 12/1981 | Gusmer | 521/121 |
| 4,401,769 | 8/1983 | Malwitz | 521/113 |
| 4,546,122 | 10/1985 | Radovich et al. | 521/164 |
| 4,546,122 | 10/1985 | Radovich et al. | 521/164 |
| 4,745,133 | 5/1988 | Grinbergs et al. | 521/128 |
| 4,849,459 | 7/1989 | Grace et al. | 521/110 |

FOREIGN PATENT DOCUMENTS 0407023  1/1991  European Pat. Off. .
WO82/00297  2/1982  Int'l Pat. Institute .

OTHER PUBLICATIONS

Merck Index, Tenth Edition (1983), pp. 10, 445, 869.
Cartmell, M. J., "Developments In The Use Of CFCs In Polyurethane Foams," (European Isocyanate Producers Association, Apr. 1989).
Hurd, R., "Alternative Blowing Agents For Flexible Foams: HFA 123 and HFA 141B" (Apr. 1989).
Klesper; "Application of Volatile Organic Liquids For Expanding Flexible Foam," *Rubber Age*, pp. 84–87 (Oct. 1958).
"Polyurethane foam process uses less CFCs," *C&EN*, p. 17 (Nov. 7, 1988).
"Decline In Solvents Use," *Chemical Week*, p. 34 (Jul. 19, 1989).
Stinson, "Polyurethane Industry Tackling CFC Reductions," *C&EN*, pp. 23–24, and 27 (Oct. 24, 1988).

*Primary Examiner*—Maurice J. Welsh
*Assistant Examiner*—Rachel Johnson
*Attorney, Agent, or Firm*—Fisher, Christen & Sabol

[57] ABSTRACT

A polyurethane foam is produced using acetone as an auxiliary blowing agent. A polyol, an isocyanate, water, acetone and a catalyst for catalyzing the formation of polyurethane are mixed to produce an unfoamed liquid mixture, which is then retained in bulk form, preferably in an open-topped reaction vessel, for a dwell time during which an exothermic reaction occurs and the liquid foams. Finally, the foaming liquid is spread on to a surface on which it is allowed to expand and form a solid polyurethane foam material. Significant reductions in the amount of auxiliary blowing agent can be achieved, as compared with conventional formulations using methylene or CFC's as auxiliary blowing agents.

49 Claims, 2 Drawing Sheets

PROCESS FOR THE PRODUCTION OF POLYURETHANE FOAM

FIELD OF THE INVENTION

This invention relates to a process for the production of polyurethane foam. More specifically, it relates to such a process in which acetone is used as a blowing agent.

BACKGROUND OF THE INVENTION

In the manufacture of polyurethane foams, a polyol, an isocyanate, water and at least one catalyst for catalyzing the formation of polyurethane foam are mixed to form a liquid mixture, which then foams and solidifies to produce the solid polyurethane foam. Reaction between the isocyanate and the water produces carbon dioxide gas, this production of carbon dioxide normally being accelerated by a catalyst present in the liquid mixture, and the carbon dioxide gas thus produced assists in formation of a foam.

However, many commercial grades of polyurethane foam require low foam densities and high foam flexibilities, and it is not possible to produce a low density, highly flexible foam using only carbon dioxide as the foam-forming gas. The water-isocyanate reaction which generates the carbon dioxide also produces solid reaction byproducts which harden the foam, so that if a high proportion of water is used in the reaction mixture, the resultant foam is too hard for many applications. Moreover, the water-isocyanate reaction is highly exothermic, to such an extent that if a high proportion of water is included in the reaction mixture, the resultant foam is produced at a temperature sufficiently high that it may be scorched by atmospheric oxidation; indeed, there have been occasional instances where foams produced from reaction mixtures containing high proportions of water have spontaneously combusted. (Incidentally, the exothermic reactions involved in polyurethane foam manufacture continue for a considerable time, typically several hours, after formation of the solid foam, so heat damage to the foam may not always be visible by observing the foam as it passes along the production line.)

Accordingly, it is conventional to include in the foam-forming mixture an auxiliary blowing agent, that is to say a blowing agent other than water, this auxiliary blowing agent being a material which is liquid at room temperature but which is relatively volatile so that it can be volatilized during the foam-forming reaction to form a gas which serves to decrease the density of the polyurethane foam without producing an excessively hard foam. Auxiliary blowing agents also serve to prevent foam becoming too hot, since some of the heat generated by the water is absorbed as latent heat of vaporization in volatilizing the auxiliary blowing agent.

For many years, the preferred auxiliary blowing agents for use in commercial polyurethane production were the chlorofluorocarbons (CFC's), especially trichloromonofluoromethane, sold under the trademark "Freon 11". The chlorofluorocarbons are highly desirable auxiliary blowing agents because of their high volatility (trichloromonofluoromethane has a boiling point of 23.7° C.) and because they are inert and thus do not interfere with the polyurethane-forming reactions. However, the chlorofluorocarbons, which persist for many years in the atmosphere, have recently been discovered to pose a major threat to the environment because they destroy the earth's ozone layer. Consequently, an international agreement has already been signed to greatly reduce annual production of chlorofluorocarbons during the next few years. Thus, it is likely that use of chlorofluorocarbons as auxiliary blowing agents in foam production will be outlawed in the near future.

Methylene chloride has been suggested, and indeed is already in commercial use, as a substitute for chlorofluorocarbon auxiliary blowing agents. Methylene chloride is highly volatile (boiling point 39.8° C.) and inert in polyurethane-forming mixtures. However, methylene chloride is a suspected carcinogen, and has other deleterious effects on workers exposed to the material. Accordingly, the concentration of methylene chloride in the air inside a foam plant must be kept low; the American Conference of Governmental Industrial Hygenists recommends that workers be exposed to not more than 50 ppm. of the chemical, while the Occupational Safety and Health Administration Permissible Exposure Limit is 500 ppm. Keeping the levels of methylene chloride in a foam plant below 50 ppm. may require additional ventilation equipment, with an associated increase in costs. In addition, the chemical is a recognized environmental pollutant, and both the Federal and state governments are beginning to limit releases of the chemical from plants which employ it. Thus, in the near future plants using methylene chloride as an auxiliary blowing agent may be faced with the substantial additional expense of installing scrubbers or similar equipment to remove methylene chloride from air and/or other gases discharged from the plant. In addition, California has recently proposed that emissions of methylene chloride in that state be subject to a heavy "pollution" tax, and other states are likely to follow a similar course of action.

Incidentally, although it might be thought that methylene chloride (molecular weight 85) would be more effective as an auxiliary blowing agent than trichloromonofluoromethane (molecular weight 137.4), in practice it is found that, in similar formulations, the two auxiliary blowing agents have essentially the same blowing activity per unit weight. Thus, the activity per unit weight of an auxiliary blowing agent cannot readily be predicted simply from its molecular weight.

Thus, both the auxiliary blowing agents presently used commercially for the production of polyurethane foams cause significant environmental problems, and it appears likely that the industry will, within the next few years, not be permitted to use these two auxiliary blowing agents at all, be subject to heavy penalties for their use, or will be required to take expensive precautions to prevent their release into the environment. Thus, there is a need for alternative auxiliary blowing agents for use in the production of polyurethane foams.

In theory, the only real requirements for an auxiliary blowing agent are that it be liquid at about ambient temperature (so that it can be introduced into the foam-forming mixture as a liquid), sufficiently volatile that it volatilizes during the formation of the polyurethane foam, and sufficiently inert that it does not interfere with the foam-forming reactions, a wide variety of materials have been proposed for use as auxiliary blowing agents. However, none other than chlorofluorocarbons and methylene chloride appear to have been used industrially, and some of the proposed compounds have disadvantages so severe that they are totally impracticable for use in industrial plants. Thus, for example, U.S. Pat. No. 4,546,122, issued Oct. 8, 1985 to Radovich et al., states concerning auxiliary blowing agents for flexible polyurethane foams:

Suitable blowing agents include water and/or readily volatile inorganic or organic substances. Appropriate organic blowing agents are acetone, ethyl acetate, halogen-substituted alkanes such as methylene chloride, chloroform, ethylidene chloride, vinylidene chloride, monofluorotrichloromethane, chlorodifluoromehhane, dichlorodifluoromethane; and butane, hexane, heptane or diethyl ethers. Inorganic blowing agents which may be used are air, $CO_2$ and $N_2O$. A blowing effect may also be achieved by adding compounds which decompose at the reaction temperature to give off a gas (e.g., nitrogen, given off by azo compounds, such as azodicarbonamide or azobutyronitrile). . . .

Of the compounds other than CFC's and other haloalkanes in this list, diethyl ether is obviously impracticable as an auxiliary blowing agent under industrial conditions because of its flammability and anesthetic effect, while the use of carbon dioxide or nitrogen requires special equipment for injection of the gaseous auxiliary blowing agents into the developing foam, and consequently these gaseous auxiliary blowing agents are not used in practice for low density polyurethane foam.

U.S. Pat. No. 3,121,699 to Merriman describes the preparation of foamed polyurethane materials using a polyalkylene ether polyol having a mean molecular weight of more than 1500, an organic polyisocyanate, water, a foam stabilizing agent and a catalyst, and acetaldehyde as an auxiliary blowing agent, the acetaldehyde being vaporized by the heat produced in the exothermic reaction of the ingredients, the acetaldehyde being included upon the ingredients forming the foam and setting of the foam being effected within a mold.

U.S. Pat. No. 3,165,483 to Gemeinhardt et al., describes the preparation of a skeletal polyurethane foam which is produced using as an auxiliary blowing agent a ketone containing from 5 to 18 carbon atoms. Alternatively, an aldehyde having from 4 to 18 carbon atoms can be used. Among the specific ketones mentioned is methyl n-propyl ketone.

U.S. Pat. No. 3,179,626 to Beitchman describes the preparation of polyurethane and polyisocyanate foams using as co-catalyst a mixture of diazabicyclooctane and an aldehyde containing from 1 to 10 carbons atoms, there being from 0.01 to 10 parts of diazabicyclooctane (sold commercially as DABCO) per part of aldehyde. In this patent, the aldehyde appears to be strictly a co-catalyst; Example V uses a conventional haloalkane as an auxiliary blowing agent.

Klesper, "Application of volatile organic liquids for expanding flexible urethane foam", Rubber Age, October 1958, 84–87, describes experiments in which various organic liquids were tested as auxiliary blowing agents for the production of flexible polyurethane foams by the two stage or "two shot" process, in which an isocyanate is first reacted with a polyol to produce a pre-polymer, and at some later time, this pre-polymer is reacted with water and catalysts to yield the polyurethane foam. This article states that acetone was not very effective in the blowing action because of a too high boiling point and high solubility in the finished polymer, which also causes the acetone to leave the finished foam slowly. The article further states that pentane alters the surface properties of the foam during rise.

U.S. Pat. No. 3,586,651 to Salyer et al. describes a process for the preparation of closed-cell rigid polyurethane foams from polyether polyols and polyisocyanates using, as a "pneumatogen" (i.e., an auxiliary blowing agent), a cyclopentane/acetone mixture. This patent teaches away from the use of acetone alone, citing the aforementioned Rubber Age article for the proposition that single compounds such as acetone or pentane are not found satisfactory, since acetone has too high a boiling point and is too soluble in the finished polymer, whereas pentane gives coarse, uneven cell structure, and cyclopentane alone cannot be used because of its immiscibility with prepolymers and liquid resins.

U.S. Pat. No. 3,193,525 to Kallert et al. describes a process for the preparation of polyurethane polymers which comprises reacting an organic polyisocyanate with a hydroxyl polyester in the presence of a carbodiimide and an enolizable compound in which from 20-95% of the compound is in the keto form, the organic compound being free of carboxylic acid groups. Among the preferred enolizable organic compounds is acetylacetone; acetone itself is not mentioned, presumably because it is not sufficiently enolizable.

U.S. Pat. No. 3,661,885 to Haddick et al. describes the use, as catalyst for polyurethane production, of complexes of stannous salts with organic complexing agents. The organic complexing agent made be a ketone, lactone or amine. The patent states (column 1, lines 48–50) that "suitable ketone includes a dialkyl ketone, e.g. methyl lower alkyl ketone such as methyl isobutyl ketone)."

U.S. Pat. No. 3,985,688 to Speech describes a method of sealing a water-bearing structure, for example a sewer, by placing at the point of leakage a fluid sealing composition comprising a water-miscible mixture of isocyanate-terminated polyoxyethylene urethane prepolymers in a compatible, water-miscible solvent, and curing the prepolymer by reaction with water to form a seal. The water-miscible solvent can be acetone.

U.S. Pat. No. 4,055,522 to Ashida et al. describes a process for producing an isocyanate-based polymer by catalytically reacting a polyisocyanate alone or in combination with a polyhydroxy compound, with the addition of an aromatic aldehyde having no functional group capable of reacting with the isocyanate group, as a smoke suppressing agent.

U.S. Pat. No. 4,251,635 to Stone describes a flexible polyurethane foam having a reduced tendency to form burning embers when it is ignited and burned; to this end a ketone or benzaldehyde, and optionally a flame retardant, is incorporated into the mixture used to produce the foam.

U.S. Pat. No. 4,259,454 to Crivello describes curable organic resin compositions, such as epoxy resins (polyurethanes are not mentioned). In column 8 of this reference does contain a discussion of volatile organic solvents which can be used to produce rigid or flexible foams, and the list given includes acetone.

U.S. Pat. No. 4,263,408 to Meyborg et al. (assigned to Bayer AG) describes a process for the production of molded foams having a compact surface and cellular core, these foams being formed by reacting a polyisocyanate, a relatively high molecular and/or low molecular weight compound having an average of at least two isocyanate-reactive hydrogen atoms, a catalyst and an auxiliary blowing agent. This patent contains a list of potential auxiliary blowing agents essentially identical to that in U.S. Pat. No. 4,546,122 discussed above.

U.S. Pat. No. 4,303,758 to Gusmer describes a closed cell phenol-aldehyde foam (there is no discussion of polyurethane foams) which is produced using an auxiliary blowing agent. Auxiliary blowing agents are discussed in detail in the paragraph bridging columns 6 and 7 of the reference and acetone is mentioned as a ketone blowing agent.

U.S. Pat. No. 4,401,769 to Malwitz describes a foam made from the reaction of a multifunctional isocyanate and a catalytic amount of an isocyanate polymerizing catalyst. In the production of the foam a softening agent is used, and this softening agent can be acetone.

The applicant has conducted experiments to determine whether acetone can be used as a substitute for CFC's and methylene chloride in the production of polyurethane foams. The results of these experiments have generally confirmed to statements in the aforementioned Rubber Age article that acetone has too high a boiling point to act satisfactorily in most conventional processes for the production of polyurethane foams. However, applicant has discovered that, by careful control of the process employed, high quality foams can be obtained using acetone as the auxiliary blowing agent.

SUMMARY OF THE INVENTION

This invention provides a process for the production of a polyurethane foam, which process comprises:

mixing a polyol, an isocyanate, water, acetone and at least one catalyst for catalyzing the formation of polyurethane foam, this mixing being effected to produce an unfoamed liquid mixture;

feeding this unfoamed liquid mixture into an open-topped reaction vessel in which the liquid mixture remains for a dwell time during which an exothermic and gas-forming reaction occurs and the liquid begins to foam; and discharging the foaming liquid from the reaction vessel on to a surface on which it is allowed to further react and form a solid polyurethane foam material.

This invention also provides a process for the production of a polyurethane foam, which process comprises:

mixing a polyol, an isocyanate, water, acetone and at least one catalyst for catalyzing the formation of polyurethane foam, this mixing being effected to produce an unfoamed liquid mixture;

allowing the unfoamed liquid mixture to react for a dwell time during which an exothermic and gas-forming reaction occurs to a degree sufficient to raise the temperature of the liquid mixture to at least about 32° C. and such that the liquid begins to foam; and thereafter spreading the foaming liquid on to a surface on which it is allowed to further react and form a solid polyurethane foam material.

This invention also provides, in a process for the production of a polyurethane foam, which process comprises:

mixing a polyol, an isocyanate, water, an auxiliary blowing agent comprising at least one of monofluorotrichloromethane and methylene chloride, and at least one catalyst for catalyzing the formation of polyurethane foam, this mixing being effected to produce an unfoamed liquid mixture; and spreading the foaming liquid on to a surface on which it is allowed to further react and form a solid polyurethane foam material, the improvement which comprises replacing at least part of the auxiliary blowing agent with acetone, the weight of acetone employed being not more than about 70 percent of the weight of auxiliary blowing agent which it replaces.

DETAILED DESCRIPTION OF THE INVENTION

Figure 1:
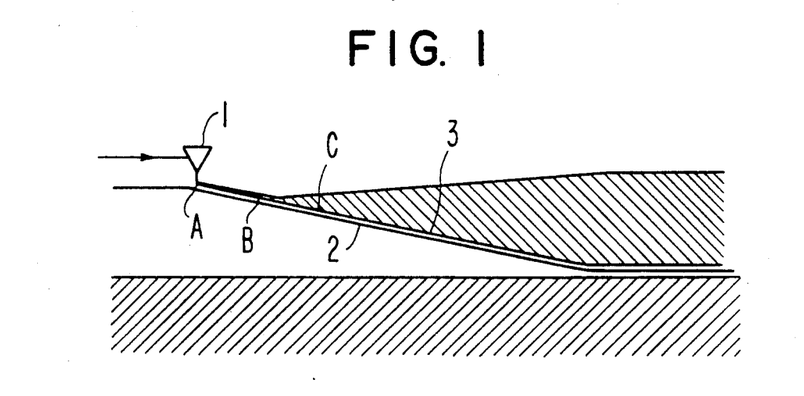
FIG. 1 is a schematic section through a mixing head and the adjacent end of a conveyor used for the production of polyurethane foams in a prior process which does not use the reaction vessel used in the process of the present invention.

In the conventional process for the production of a polyurethane foam shown in FIG. 1 and known as the "wet laydown" process, a polyol, an isocyanate, water, an auxiliary blowing agent and a catalyst are separately metered to a mixing head 1; in practice, two types of catalyst are normally employed, an amine catalyst to control the rate of the isocyanate-water reaction which generates carbon dioxide, and an organotin catalyst which controls the rate of the isocyanate-polyol reaction. The mixing head continuously mixes the starting materials, and the dwell time of the materials in the mixing head rarely exceeds 0.5 seconds.

The resultant mixture leaves the mixing head 1 as a liquid and is deposited directly at point A upon a downwardly sloping conveyor 2; this conveyor 2 carries a plastic film 3, which is discarded after a single pass along the conveyor 2, the plastic film serving to prevent the conveyor 2 becoming contaminated with foam residue and also serving to provide a smooth lower surface on the foam produced. The conveyor 2 typically slopes downwardly at an angle of 3.5°–6° to the horizontal to drain the mixture forwardly away from the mixing head 1. At point A, the mixture is completely fluid and drains easily. A short distance along the conveyor, at point B (the so-called "cream line"), the foam-forming reactions begin to affect the mixture, its viscosity begins to increase, and gas bubbles form. Care must be taken that the fluid mixture from the mixing head does not "undercut" at point C i.e., the liquid mixture from the mixing head must not run between the foam which is beginning to form and the conveyor 2, or an unsatisfactory foam product will result.

The distance between points A and B is affected by conveyor speed, angle of slope of the conveyor and catalyst concentrations, together with other factors affecting the rate of the foam forming reaction including the specific polyol and isocyanate employed, etc. The slower the start of the reaction, the greater the distance between points A and B, and as this distance is progressively increased, there comes a point at which undercutting at point B and the production of an unsatisfactory foam become inevitable. Although this distance can be decreased by increasing the catalyst concentration in the mixture, there are limits to the amounts of catalyst which can be employed, since excessive amounts of catalyst (and hence very high reaction rates) may produce collapse of foam, splits in the foam or a pneumatic (closed cell) foam, and any of these defects may render the foam unsalable. Hence, the scope for decreasing the distance between points A and B by increasing catalyst concentration in the mixture is limited.

Conventional polyurethane-forming mixtures containing trichloromonofluoromethane as the auxiliary blowing agent give entirely satisfactory results in this wet laydown process. However, when attempts were made to use a similar reaction mixture containing 10 php. (parts by weight per 100 parts by weight of polyol) of acetone, the distance between points A and B more than tripled, as compared with the same formulation using trichloromonofluoromethane and the foam was unusable. To reduce this distance to a value which would prevent undercutting required such a large increase in catalyst concentration that the resultant foam was again unsalable.

In the process of the present invention, the reactants are not, immediately after their admixture, spread over the surface on which the foam is to be formed. Instead, the reactants are retained in a bulk form for a dwell time during which an exothermic and gas-forming reaction occurs and the liquid begins to foam. Although other techniques, such as passing the reactants through a pipe of gradually increasing diameter may be employed, the retention of the reactant mixture in bulk form prior to spreading this mixture is preferably achieved by feeding the mixture into an open-topped reaction vessel in which the reactant mixture remains for the dwell time. Processes using such an open-topped reaction vessel (referred to hereinafter as "trough processes") are known in the polyurethane art and are described, inter alia, in U.S. Pat. No. 4,246,356, issued Jan. 20, 1981 to the present inventor.

Figure 2:
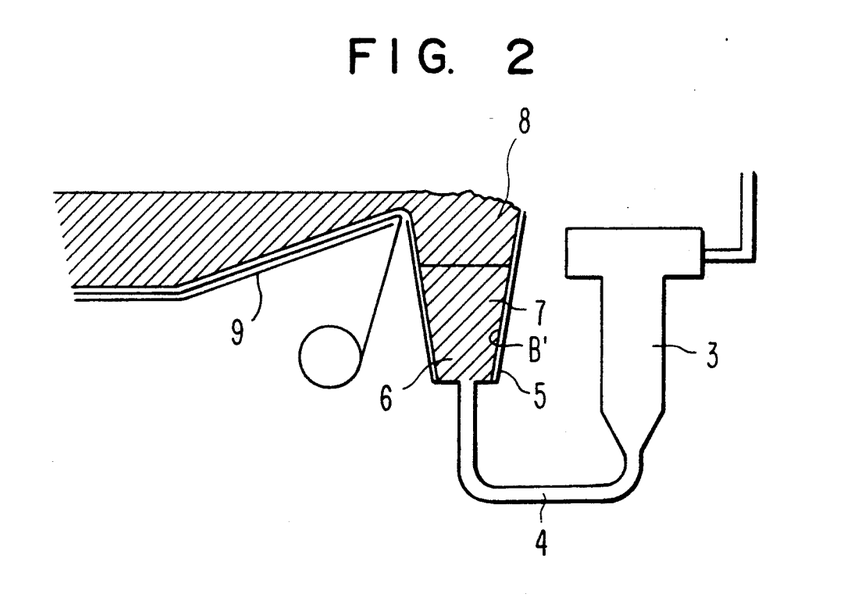
FIG. 2 of the accompanying drawings is a highly schematic side elevation, partially in cross-section, of an apparatus for carrying out the process of the present invention.

As illustrated in FIG. 2 of the accompanying drawings, in the preferred trough process of the present invention all the reactants are fed to a mixing head 3, which can be identical to the mixing head 1 shown in FIG. 1. However, instead of flowing out of the mixing head 3 directly on to a conveyor, in a trough process the mixture of reactants leaving the mixing head 3 is passed via a tube 4 to the bottom of a trough 5. The volume of this trough is made sufficiently large relative to the throughput of reactants that the reactants in the trough form three zones, designated 6, 7 and 8 in FIG. 2. The lowest zone 6 contains wet chemicals, while the central zone 7 contains creamed chemicals; thus, the boundary between zones 6 and 7, designated B', corresponds to the cream line B in FIG. 1. The upper zone 8 contains frothing chemicals. From the upper end of zone 8, the frothing chemicals are allowed to overflow on to a downwardly sloping conveyor 9, which can be identical to the conveyor 2 in FIG. 1. The overflow of the frothing chemicals from zone 8 corresponds to a deposition of the same chemicals at approximately point C in FIG. 1; thus, the trough process eliminates the undercutting which may otherwise occur at point B.

Whether the retention of the reactant mixture in bulk form is effected using the apparatus shown in FIG. 1 or in some other manner, the spreading of the mixture is desirably postponed until the temperature of the liquid mixture has reached at least about 32° C.

In the process of the present invention, the acetone is desirably used in an amount of from about 1 to about 18 php, preferably about 1 to about 12 php. It is one of the advantages of using acetone in place of CFC's or methylene chloride as an auxiliary blowing agent that a smaller weight of acetone suffices to produce the same degree of blowing (measured as the density of the resulting foam). As shown in the Examples below, in general a quantity of acetone equal to about 55% of the weight of methylene chloride or trichloromonofluoromethane used in a foam formulation will produce the same density in the resultant foam. This substantial reduction in the quantity of auxiliary blowing agent required to achieve a given foam density is unexpected given that, as already noted, the weight of methylene chloride which must be employed to produce a given foam density in a specific foam formulation is substantially the same as the weight of trichloromonofluoromethane required under the same circumstances, notwithstanding the significantly lower molecular weight of methylene chloride. Furthermore, the reduction in optimum amount of blowing agent achieved with acetone is greater than could be predicted on the basis of molecular weight alone; the molecular weight of acetone is approximately 68% of the molecular weight of methylene chloride, so the reduction of 45% in the weight of auxiliary blowing agent when substituting acetone for methylene chloride represents a reduction of approximately 19% in the molar amount of auxiliary blowing agent required.

Furthermore, the reduction in the quantity of auxiliary blowing agent required achieved by substituting acetone for methylene chloride or trichloromonofluoromethane is not accompanied by any reduction in the cooling effect of the auxiliary blowing agent on the foam. The latent heat of vaporization of acetone is substantially greater than that of methylene chloride (124.5 cals/g. for acetone, 76 cals/g for methylene chloride), and indeed direct measurements of foam temperature (see Examples 12 and 13 below) indicate that the peak temperature attained by a scorchy foam using acetone as the auxiliary blowing agent is slightly lower than that of the same foam using methylene chloride, despite the fact that the latent heat required to volatilize the quantity of acetone employed is less than that required to volatilize the quantity of methylene chloride employed.

The polyols which are employed in the present process may be any of those known to be suitable for use in preparing conventional polyurethane foams, and such polyols are well known to those skilled in the art. They are often prepared by the catalytic condensation of an alkylene oxide or mixture of alkylene oxides either simultaneously or sequentially with an organic compound having at least two active hydrogen atoms, such as those described in U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids, of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Other polyols which may be employed have incorporated therein vinylic polymers. These polyols may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, or (3) by low temperature polymerization in the presence of chain transfer agents.

The preferred polyols for use in the present process are polyether polyols, desirably those having an average molecular weight in the range of from about 1000 to about 10000. In a particularly preferred embodiment of the present invention, the polyol is a polymer-modified polyol comprising a dispersion of a polymeric substance in a carrier polyol, the polymeric substance being a polyaddition product of an alkanolamine and an isocyanate. Polyols of this type, which are known commercially by the tradename PIPA, are described and claimed in U.S. Pat. No. 4,374,209 to Rowlands. A similar type of polymer-modified polyol in which the disperse phase comprises the reaction product of an isocyanate with at least one polyamine and/or hydrazine and/or hydrazide (these being known as "PHD" polyols) may also be used in the present process. Another type of polymer-modified polyol which may be used in the process of the present invention is one in which the disperse phase is a styrene/acrylonitrile graft polymer.

The isocyanate used in the present process may be any of those known in the prior art to be effective in producing polyurethanes. Thus, organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2',5,5'-tetraisocyanate and polymeric polyisocyanates such as polymethylene polyphenylene polyisocyanate. Especially useful due to its availability and properties is toluene diisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethanediamine. These crude isocyanates are disclosed in U.S. Pat. No. 3,215,652.

In the present process, the water is preferably present in an amount of from about 1 to about 6 parts by weight per 100 parts by weight of polyol.

The catalyst used in the present process desirably comprises a first catalyst material for catalyzing the reaction of the polyol and the isocyanate to form the polyurethane polymer, and a second catalyst material for catalyzing the reaction of the isocyanate with the water to generate gas and thus produce blowing of the foam. Desirably, the first catalyst material comprises an organotin compound and the second catalyst material comprises an amine. Examples of appropriate organotin compounds include stannous chloride, stannous octoate, dibutyltin di-2-ethyl hexanoate, and stannous oxide. Examples of appropriate amines are triethylene diamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropylpropylenediamine, 3-diethylaminopropyldiethylamine and dimethylbenzylamine.

When the process of the present invention is carried out using the two conventional catalyst materials, it has been found that the optimum amount of these catalyst materials are substantially the same as in conventional polyurethane production processes using methylene chloride and/or trichloromonofluoromethane as the auxiliary blowing agents, provided that the amount of acetone auxiliary blowing agent is reduced to about 55% of the weight of methylene chloride and/or trichloromonofluoromethane used in the same formulation; as already noted, this quantity of acetone will give substantially the same foam density as the conventional auxiliary blowing agents. If a higher proportion of acetone is employed, the amounts of catalyst may have to be increased.

Although the optimum dwell time of the liquid mixture in the reaction vessel will vary with a number of factors, including the reactivities of the polyol and isocyanate employed, and the catalyst concentration, in general it is desirable that the dwell time be in the range of from about 12 to about 40 seconds, preferably in the range of from about 15 to about 30 seconds. To ensure a proper blowing action, the foaming liquid at the time of spreading should have a temperature of not less than about 32° C., preferably not less than about 37° C. Furthermore, to ensure proper foaming, it is desirable that the temperature increase in the reaction mixture during the dwell time (i.e., the difference between the foaming liquid leaving the reaction vessel and the unfoamed liquid entering this vessel) is at least about 16° C., preferably at least about 19° C.

The present invention is not restricted to the use of acetone alone as an auxiliary blowing agent. In the present process, acetone may be used in combination with other auxiliary blowing agents, for example a chlorofluorocarbon such as trichloromonofluoromethane, or methylene chloride, although desirably at least about 25%, and preferably the major proportion by weight of the auxiliary blowing agent is acetone. Since acetone is freely miscible with both fluorotrichloromethane and methylene chloride, no difficulties are encountered in introducing the two auxiliary blowing agents simultaneously into the mixture.

As is well-known to those skilled in the art of polyurethane manufacture, a variety of additives may be included in the foam-forming mixture to control various properties of the reaction mixture and/or the resultant foam. It is desirable that the mixture include a surface-active agent to produce a foam containing small cells of fairly uniform size, and the preferred surface-active agent for this purpose is a silicone surfactant; various commercially-available silicone surfactants suitable for use in producing polyurethane foams are well known to those skilled in the art.

The foam-forming mixture may include one or more flame-retardants to improve the flame resistance of the resultant foam. A preferred flame-retardant for use in the present invention is melamine, either alone or in combination with at last one other flame-retardant, which is desirable a halo-substituted phosphate ester flame-retardant. The use of melamine, alone or in combination with a halo-substituted phosphate flame-retardant, in high-resilience flexible polyurethane foams is described and claimed in copending application Ser. No. 07/166,750 in the name of the present inventor. The entire disclosure of this copending application is herein incorporated by reference.

The use of acetone as an auxiliary blowing agent in accordance with the present invention has been found to produce foams of quality equal to those produced with methylene chloride or CFC auxiliary blowing agents. The foams produced using acetone normally have very fine cells with a high air permeability and a notable absence of pea-holes. Furthermore, acetone is much less toxic than methylene chloride; the American Conference of Governmental Industrial Hygenists standard is 750 ppm., and the Occupational Safety and Health Permissible Exposure Limit is 1000 ppm, as compared to values of 50 and 500 ppm. respectively for methylene chloride, so that acetone poses lesser problems in ventilating a foam plant than does methylene chloride. In addition, discharge of acetone into the environment is less damaging, and thus less likely to be subject to strict governmental regulation, than the more toxic methylene chloride. Acetone does not have the damaging effects on the atmosphere that CFC's do. Although acetone is inflammable, its explosive limits in air vary within the range 2.6–12.8%, concentrations so high that there is no appreciable danger of explosion in any foam plant with normal ventilation. The autoignition temperature of acetone is 1118° F., so storage of bulk quantities of acetone does not pose unusual dangers and is well within the usual level of skill in the polyurethane foam industry. Finally, acetone is freely miscible with water and a high proportion of acetone in gas discharged from a polyurethane plant can be removed by conventional apparatus for scrubbing the discharge gases with water. CFC's and methylene chloride are water-immiscible and are far more difficult to remove from discharge gases by scrubbing.

The following Examples are now given, though by way of illustration only, to show details of preferred reagents, conditions and techniques used in the process of the present invention. In these Examples, certain materials are identified by their commercial names, as follows:

A-1 Catalyst—an amine catalyst sold by Union Carbide Corporation

33 LV Catalyst—a 33% solution of triethylenediamine in dipropylene glycol, sold by Air Products and Chemicals Corp.

B 8021 Silicone—a silicone surfactant sold by Goldschmidt Chemical Corp.

TDI—commercial toluene diisocyanate, containing approximately 80% of the 2:4 isomer and approximately 20% of the 2:6 isomer.

Two different polyols were used in these Examples. The "3000 Polyol" was a glycerol based polyether triol having an average molecular weight of 3000 in which the polyoxyalkylene groups comprised approximately 90% of propylene oxide and approximately 10% of ethylene oxide, the two alkylene oxides being added as a random mixture; the terminal functional groups of this polyol were secondary hydroxyl groups. The "3500 Polyol" was generally similar except that it had an average molecular weight of approximately 3500 and the random mixture of alkylene oxide residues comprised approximately 88% propylene oxide and approximately 12% ethylene oxide.

In the Examples, "ILD" refers to indentation load deflection, as measured by the conventional American Society for Testing and Materials specification.

In all of the following Examples, foam was produced using an apparatus as shown in FIG. 2 of the accompanying drawings with a trough having a volume of 125 l. The apparatus used conventional high pressure metering/mixing equipment; the mixing head was a high pressure model, having a diameter of 3.15 inches (80 mm.) and a length of 10 inches (254 mm.). The polyol was fed to the mixing head at 10 psig. (75 Kbar.), the methylene chloride or acetone at 12 psig. (90 Kbar.), and the other reactants at 550–950 psig. (4.1–7.1 MBar.). The inclined conveyor had a width of 84 inches, a length of 22.5 ft. and a slope of 5.5° for the first 8 feet adjacent the trough.

EXAMPLES 1 AND 2

These Examples illustrate the use of acetone as an auxiliary blowing agent on an industrial scale, and also illustrate the relative efficiencies of methylene chloride and acetone as auxiliary blowing agents. Example 1 is a conventional formulation using methylene chloride as the auxiliary blowing agent, while Example 2 is a similar formulation using acetone as the auxiliary blowing agent. The compositions of the two formulations were as follows.

|  | Example No. | |
|---|---|---|
|  | 1 (Control) | 2 |
| 3000 Polyol | 100.0 | 100.0 |
| Water | 3.05 | 3.45 |
| A-1 Catalyst | 0.06 | 0.04 |
| Dabco 33 LV | 0.62 | 0.63 |
| Stannous Octoate | 0.30 | 0.30 |
| B-8021 Silicone | 1.95 | 1.95 |
| Methylene chloride | 22.50 | — |
| Acetone | — | 10.00 |
| TDI | 41.50 | 45.16 |
| Resultant foam |  |  |
| Density (lb/ft$^3$) | 1.05 | 1.05 |
| ILD (lb.) | 11.0 | 11.0 |

The foam forming mixture was fed to the mixing head at a rate of 495 pounds (224.5 kg.) per minute, resulting in a dwell time in the trough of approximately 25 seconds.

From the data given above, it will be seen that the two formulations produced foams with the same densities and ILD's, so that the two combinations of blowing agents (water/methylene chloride and water/acetone) were equally as effective. It is generally accepted by those skilled in the polyurethane art that 1 part by weight of water is equivalent in blowing capacity to 10 parts by weight of methylene chloride or trichloromonofluoromethane. Thus, the 22.5 parts by weight of methylene chloride in Example 1 is equivalent to 2.25 parts by weight of water, and the combination of this methylene chloride and the 3.05 parts by weight of water gives the foam a "blowing equivalent" of 5.30 parts by weight of water.

Since the water/acetone blowing agent in Example 2, produced foam with the same properties as the foam produced in Example 1, the foam of Example 2 must also have a "blowing equivalent" of 5.30 parts by weight of water. Deducting the 3.45 parts by weight of actual water present in Example 2, it follows that 10.0 parts by weight of acetone is equivalent to 5.30−3.45=1.85 parts by weight of water. Thus, 1 part by weight of water is equivalent to 5.405 parts by weight of acetone, and the relative weight equivalents of water, methylene chloride and acetone are:

$$1.0:10.0:5.405.$$

Thus, it should be possible to substitute approximately 54.05 parts by weight of acetone for 100 parts by weight of methylene chloride auxiliary blowing agent without changes in the properties of the foam produced.

EXAMPLES 3 AND 4

These Examples illustrate the use of acetone as an auxiliary blowing agent in foams having a higher density than those produced in Examples 1 and 2. Example 3 is a conventional formulation using methylene chloride as the auxiliary blowing agent, while Example 4 is a similar formulation using acetone as the auxiliary blowing agent. The compositions of the two formulations were as follows.

|  | Example No. | |
|---|---|---|
|  | 3 (Control) | 4 |
| 3500 Polyol | 100.0 | 100.0 |

-continued are by weight. Examples 5–8 used the 3000 polyol, while Examples 9 and 10 employed the 3500 Polyol.

TABLE 1

|  | Example No. | | | | | |
| --- | --- | --- | --- | --- | --- | --- |
|  | 5 (Control) | 6 | 7 (Control) | 8 | 9 (Control) | 10 |
| Polyol | 100.0 | 100.0 | 100.0 | 100.0 | 100.0 | 100.0 |
| Water | 4.05 | 4.05 | 5.15 | 5.15 | 1.97 | 1.97 |
| A-1 Catalyst | 0.07 | 0.07 | 0.053 | 0.053 | 0.086 | 0.086 |
| 33 LV Catalyst | 0.06 | 0.06 | — | — | 0.011 | 0.011 |
| Stannous Octoate | 0.29 | 0.29 | 0.26 | 0.26 | 0.24 | 0.24 |
| B 8021 Silicone | 1.60 | 1.60 | 1.05 | 1.05 | 1.10 | 1.10 |
| Methylene chloride | 11.3 | — | 6.0 | — | 10.7 | — |
| Acetone | — | 6.2 | — | 3.3 | — | 5.9 |
| TDI | 53.39 | 53.39 | 65.50 | 65.50 | 29.98 | 29.98 |
| % Reduction in blowing agent, acetone v. methylene chloride |  | −45 |  | −45 |  | −45 |
| Resultant foam |  |  |  |  |  |  |
| Density (lb/ft$^3$) | 1.05 | 1.05 | 1.05 | 1.02 | 1.85 | 1.86 |
| ILD (lb.) | 19.2 | 18.5 | 30.3 | 29.8 | 22.0 | 21.2 |

|  | Example No. | |
| --- | --- | --- |
|  | 3 (Control) | 4 |
| Water | 3.05 | 3.14 |
| A-1 Catalyst | 0.01 | 0.06 |
| Dabco 33 LV | 0.03 | 0.055 |
| Stannous Octoate | 0.22 | 0.21 |
| B-8021 Silicone | 1.10 | 1.15 |
| Methylene chloride | 7.30 | — |
| Acetone | — | 3.50 |
| TDI | 41.50 | 41.70 |
| Resultant foam |  |  |
| Density (lb/ft$^3$) | 1.45 | 1.45 |
| ILD (lb.) | 27.0 | 28.0 |

The rate at which the foam forming mixture was fed to the mixing head and the dwell time were the same as in Examples 1 and 2 above.

The results obtained in these two Examples essentially confirm those obtained in Examples 1 and 2 above. Example 3 has a total blowing equivalent of 3.05+(7.3/10)=3.78 parts by weight of water. Assuming the same blowing equivalent for the foam of Example 4, 3.50 parts by weight of acetone are equivalent to 3.78−3.14=0.64 parts by weight of water, so 5.47 parts by weight of acetone are equivalent to 1 part by weight of water.

Taking Examples 1–4 together, replacement of methylene chloride with approximately 54.5% of its weight of acetone will yield a foam with the same properties; thus replacement of methylene chloride with acetone permits a 45.5% reduction in the weight of auxiliary blowing agent, equivalent to a 19% mole reduction.

EXAMPLES 5–10

These Examples illustrate the 45% reduction in the quantity of auxiliary blowing agent which can be achieved by substituting acetone for methylene chloride or trichloromonofluoromethane, without significant changes in the density and indentation load deflection of the foam, and also illustrate the ability of acetone to reduce the peak temperature attained by a "scorchy" foam, notwithstanding the reduction in quantity of blowing agent used.

The foams in these Examples were produced in the same way as in Examples 1–4 above, and the compositions of the foam forming mixtures and the properties of the resultant foams are shown in Table 1 below; all parts It will be seen from the data in Table 1 that the use of acetone enabled the amount of auxiliary blowing agent to be reduced 45 percent by weight, as compared with the conventional formulations containing methylene chloride, without increasing foam density or significantly affecting the strength of the resultant foam.

Figure 3:
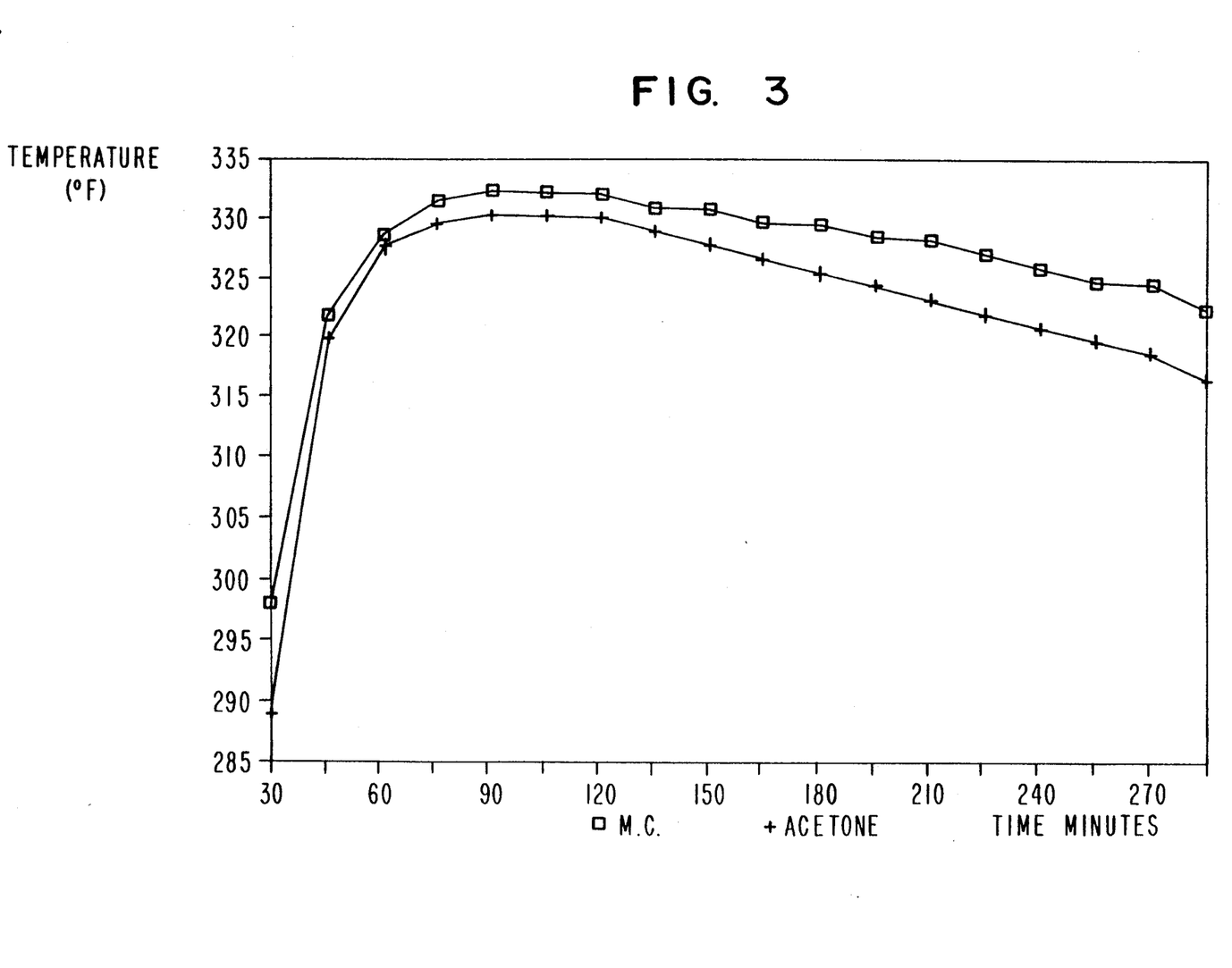
FIG. 3 is a graph of foam temperature against time summarizing the data generated in Examples 7 and 8 below.

To investigate whether the substitution of acetone for methylene chloride had any effect on the temperature rise within the foam, thermocouples were placed in blocks of foam produced in Examples 7 and 8; these Examples were chosen because the foam formulation used contained was a scorchy foam because of its high water content. The first observation from the thermocouples was taken 30 minutes after the foam formulations were mixed, and observations were taken every 15 minutes until 4 hours and 15 minutes after mixing, this time range being chosen because it was known to cover the time at which maximum foam temperature is attained. The results are shown in FIG. 3. From this Figure, it will be seen that, although the differences in foam temperature between the methylene chloride and acetone blown foams were small, the acetone blown foam remained at a lower temperature than the methylene chloride blown foam throughout the observation period, and thus the acetone blown foam should be less susceptible to scorching.

What is claimed is:

1. A process for the production of a polyurethane foam, which process comprises:
   mixing a polyol, an isocynate, water, acetone in an amount of from about 1 to about 18 parts by weight per 100 parts by weight of polyol, and at least one catalyst for catalyzing the formation of polyurethane foam, said mixing being effected to produce an unfoamed liquid mixture;
   feeding said unfoamed liquid mixture into an open-topped reaction vessel in which said liquid mixture remains for a dwell time during which an exothermic and gas-forming reaction occurs and the liquid begins to foam; and
   discharging the foaming liquid from the reaction vessel at a temperature of not less than about 32° C. on to a surface on which it is allowed to further react and form a solid polyurethane foam material.

2. A process according to claim 1 wherein the acetone is used in an amount of from about 1 to about 12 parts by weight per 100 parts by weight of polyol.

3. A process according to claim 1 wherein the acetone is used in an amount of from about 0.5 to about 7 parts by weight per part by weight of water in the unfoamed liquid mixture.

4. A process according to claim 1 wherein the polyol is a polyether polyol.

5. A process according to claim 1 wherein the polyol has an average molecular weight in the range of from about 1000 to about 10000.

6. A process according to claim 1 wherein the polyol is a polymer-modified polyol comprising a dispersion of a polymeric substance in a carrier polyol.

7. A process according to claim 6 wherein the polymeric substance is a polyaddition product of an alkanolamine and an isocyanate.

8. A process according to claim 6 wherein the polymeric substance is a reaction product of an isocyanate with at least one member selected from the group consisting of polyamines, hydrazines and hydrazides.

9. A process according to claim 6 wherein the polymeric substance is a styrene/acrylonitrile graft polymer.

10. A process according to claim 1 wherein the isocyanate is toluene diisocyanate.

11. A process according to claim 1 wherein the water is used in an amount of from about 1 to about 6 parts by weight per 100 parts by weight of polyol.

12. A process according to claim 1 wherein the at least one catalyst comprises a first catalyst material for catalyzing the reaction of the polyol and the isocyanate to form the polyurethane polymer, and a second catalyst material for catalyzing the reaction of the isocyanate with the water to generate gas and thus produce blowing of the foam.

13. A process according to claim 12 wherein the first catalyst material comprises an organotin compound and the second catalyst material comprises an amine.

14. A process according to claim 1 wherein the dwell time is in the range of from about 12 to about 40 seconds.

15. A process according to claim 14 wherein the dwell time is in the range of from about 15 to about 30 seconds.

16. A process according to claim 15 wherein the foaming liquid leaving the reaction vessel has a temperature of not less than about 37° C.

17. A process according to claim 1 wherein the temperature difference between the foaming liquid leaving the reaction vessel and the unfoamed liquid entering said vessel is at least about 16° C.

18. A process according to claim 1 wherein the unfoamed mixture is introduced into the open-topped reaction vessel at or adjacent the bottom of the vessel, and the foaming liquid is allowed to overflow from the top of the vessel.

19. A process according to claim 18 wherein the foaming liquid leaving the reaction vessel overflows on to a downwardly-sloping conveyor.

20. A process according to claim 1 wherein the mixture further comprises a silicone surfactant.

21. A process according to claim 1 wherein the mixture further comprises a fire-retardant.

22. A process according to claim 21 wherein the fire-retardant comprises melamine.

23. A process according to claim 22 wherein the fire-retardant further comprises a halo-substituted alkyl phosphate flame-retardant.

24. A process according to claim 1 wherein said mixture is essentially free from any auxiliary blowing agents other than acetone.

25. A process according to claim 1 wherein said mixture further comprises at least one auxiliary blowing agent other than acetone.

26. A process according to claim 25 wherein the additional auxiliary blowing agent is at least one of monofluorotrichloromethane and methylene chloride.

27. A process according to claim 25 wherein acetone comprises at least about 25 percent by weight of the total weight of blowing agents.

28. A process according to claim 27 wherein acetone comprises at least about 50 percent by weight of the total weight of blowing agents.

29. A polyurethane foam produced by a process according to claim 1.

30. A process for the production of a polyurethane foam, which process comprises:
    mixing a polyol, an isocyanate, water, acetone in an amount of from about 1 to about 12 parts by weight per 100 parts by weight of polyol, and at least one catalyst for catalyzing the formation of polyurethane foam, said mixing being effected to produce an unfoamed liquid mixture;
    allowing the unfoamed liquid mixture to react for a dwell time during which an exothermic and gas-forming reaction occurs to a degree sufficient to raise the temperature of the liquid mixture to at least about 32° C. and such that the liquid begins to foam; and
    thereafter spreading the foaming liquid on to a surface on which it is allowed to further react and form a solid polyurethane foam material.

31. A process according to claim 30 wherein the polyol is a polymer-modified polyol comprising a dispersion of a polymeric substance in a carrier polyol, the polymeric substance being a polyaddition product of an alkanolamine and an isocyanate.

32. A process according to claim 30 wherein the dwell time is in the range of from about 12 to about 40 seconds.

33. A process according to claim 32 wherein the dwell time is in the range of from about 15 to about 30 seconds.

34. A process according to claim 30 wherein the foaming liquid, prior to spreading on the surface, has a temperature of not less than about 37° C.

35. A process according to claim 30 wherein the mixture further comprises a fire-retardant.

36. A process according to claim 35 wherein the fire-retardant comprises melamine.

37. A polyurethane foam produced by a process according to claim 30.

38. In a process for the production of a polyurethane foam, which process comprises:
    mixing a polyol, an isocyanate, water, and auxiliary blowing agent comprising at least one of monofluorotrichloromethane and methylene chloride, and at least one catalyst for catalyzing the formation of polyurethane foam, said mixing being effected to produce an unfoamed liquid mixture; and
    spreading the foaming liquid on to a surface on which it is allowed to further react and form a solid polyurethane foam material,
    the improvement which comprises replacing at least part of said auxiliary blowing agent with acetone, the weight of acetone employed being not more than about 70 percent of the weight of auxiliary blowing agent which it replaces, and wherein the unfoamed liquid mixture is allowed to react for a dwell time during which an exothermic and gas-forming reaction occurs to a degree sufficient to raise the temperature of the liquid mixture to at least about 32° C. and such that the liquid begins to foam; and thereafter the foaming liquid is spread on to the surface on which it is allowed to further react and form the solid polyurethane foam material.

39. A process according to claim 38 wherein the auxiliary blowing agent consists essentially of at least one of monofluorotrichloromethane and methylene chloride and the weight of acetone employed is not more than about 60 percent of the weight of auxiliary blowing agent which it replaces.

40. A process according to claim 38 wherein at least about 50 percent of the auxiliary blowing agent is replaced with acetone.

41. A process according to claim 40 wherein essentially all of the auxiliary blowing agent is replaced with acetone.

42. A process according to claim 38 wherein the unfoamed liquid mixture is fed into an open-topped reaction vessel in which said liquid mixture remains for a dwell time during which an exothermic and gas-forming reaction occurs and the liquid begins to foam; and wherein the foaming liquid from the reaction vessel is thereafter discharged on to the surface on which it is allowed to further react and form the solid polyurethane foam material.

43. A process according to claim 42 wherein the dwell time is in the range of from about 12 to about 40 seconds.

44. A process according to claim 43 wherein the dwell time is in the range of from about 15 to about 30 seconds.

45. A process according to claim 38 wherein the dwell time is in the range of from about 12 to about 40 seconds.

46. A process according to claim 45 wherein the dwell time is in the range of from about 15 to about 30 seconds.

47. A process according to claim 38 wherein the foaming liquid, prior to spreading on the surface, has a temperature of not less than about 37° C.

48. A process according to claim 38 wherein the unfoamed liquid mixture comprises at least about 5 parts by weight of water per 100 parts by weight of polyol.

49. A polyurethane foam produced by a process according to claim 38.

* * * * *